Nov. 2, 1937.                W. S. KELL                2,097,924
                              FLY PAPER
                          Filed Feb. 25, 1937
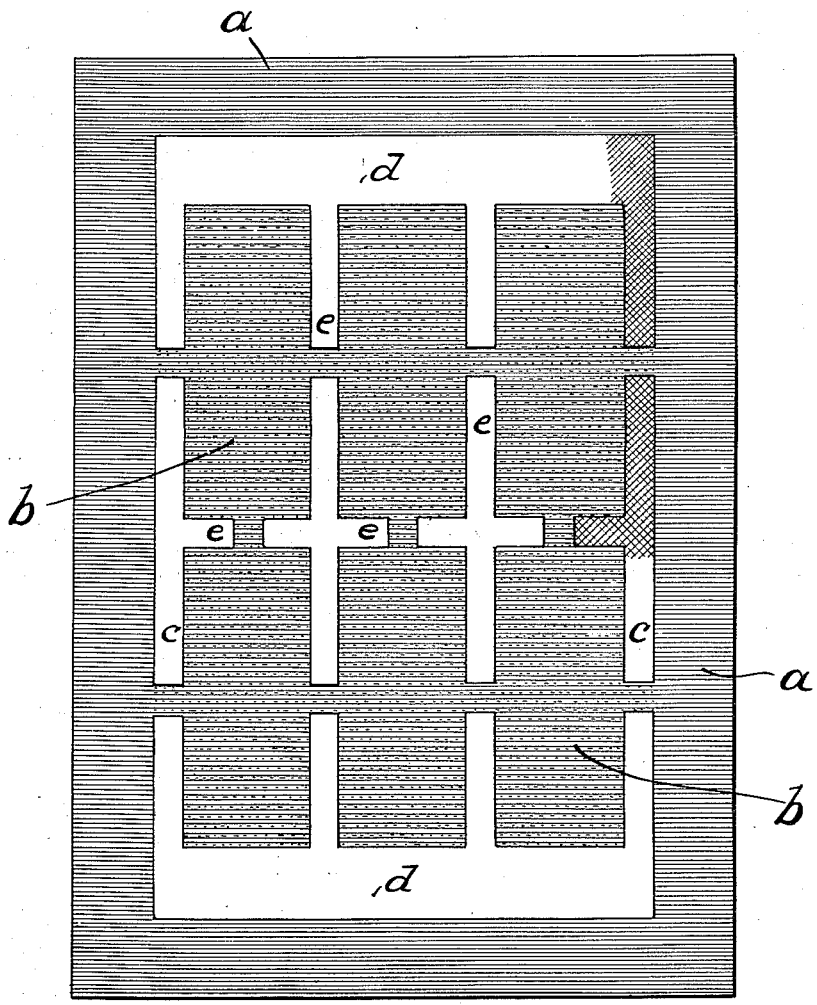
WITNESS:
INVENTOR
William S. Kell
BY
ATTORNEYS.

Patented Nov. 2, 1937

2,097,924

UNITED STATES PATENT OFFICE 2,097,924

FLY PAPER

William S. Kell, Upper Darby, Pa.

Application February 25, 1937, Serial No. 127,634

5 Claims. (Cl. 43—114)

Experiments have recently been made to determine whether the common house fly (musca domestica) is capable of distinguishing between different colors. Such experiments have demonstrated that certain colors have a more powerful attraction for flies than other colors and that, all other conditions being equal, two or three times as many flies will alight upon or occupy surfaces of certain colors than surfaces of certain other colors. Thus it has been demonstrated that a dark blue (hortense blue) color will powerfully attract the fly and that a dark red (carmine) color is next in order of preference, being closely followed by light gray and canary yellow, and that such colors as primrose, ivory and foam green are at the opposite end of the scale of preference and may possibly have a repellant function. It has also been observed that the fly prefers a rough surface to a smooth surface, or, more accurately, a less smooth surface to a smoother surface, it being borne in mind that a surface that might be fairly smooth to the human touch is rough to the fly.

My invention comprises a fly paper having certain characteristics that better adapt it to attract flies than the ordinary fly paper of commerce. Such characteristics comprise a sheet of paper having a smooth base or field or background and of a preferential color and part of which is covered with the ordinary adhesive or sticky fly-catching material and part of which is not so covered, said field being intersected by tracks, having a comparatively rough and preferably uncolored surface, adjoining or surrounding or intersecting the adhesive-covered part of the field, so that the fly will first be attracted by a great area of color, will then tend to occupy initially the rough areas thereof and will speedily and finally find its way to the adhesive area or field of capture.

A preferred embodiment of the invention is shown in the accompanying drawing, which is a plan view of a sheet of fly paper embodying the invention.

A sheet of paper, as it comes from the paper mill, is of a color, throughout the whole or major part of its area, for which flies have a preference, which, preferably, should be one or more of the following colors, in the following order of preference: dark blue, dark red (carmine), light gray, canary yellow and orange. The sheet may less preferably have a colored field comprising a plurality of preferential colors.

Spaced from the margin $a$ of the colored sheet, which margin preferably is not covered by adhesive, is an inner colored field $b$ covered by adhesive and enclosed and intersected by strips or tracks, presenting a comparatively rough surface such as that produced by a coating of fine sand or any finely comminuted solid material. Such roughened strips or tracks are preferably neither colored nor covered by the adhesive material covering the area $b$. The strips or tracks may themselves be intersected or interrupted by colored areas covered with adhesive.

The fly paper illustrated and above described is admirably adapted to both attract and capture flies. The fact that almost the whole area responds to the color preference of the fly and that a substantial, although quite minor, part of its area exhibits a rough surface insures that any flies in the vicinity of the paper will be attracted to and alight thereon. Once alighting upon the rough surface, which initially the fly is very apt to occupy, a short journey in any direction brings it to the field of capture.

The roughened area comprises preferably a rectangular figure, spaced from the edge of the paper, whose longer opposite sides $c, c$ are comparatively narrow and whose shorter opposite ends $d, d$ are comparatively wide; opposite sides, or opposite ends, or both, being connected by comparatively narrow strips $e$; the sides, ends and cross strips being preferably interrupted by small areas of colored adhesive. The colored area covered with adhesive is preferably entirely enclosed within the rectangle having a rough uncolored surface, although adhesive may be applied to the surface of the paper adjoining the outer margin of the rectangular figure.

The invention is capable of being embodied in many different forms, of which that shown is merely illustrative. While the invention is described as applied to fly paper, it will be understood that that term is intended to be broad enough to include any material adapted to have a sticky substance applied to its surface and also to include other forms of fly catchers such as tape.

What I claim and desire to protect by Letters Patent is:

1. A sheet of fly paper the major part of the surface of which is comparatively smooth and of a color for which the fly exhibits a preference, a minor part of the surface of which is comparatively rough, the interior part of the colored surface adjacent the roughened surface being covered with a sticky substance, the marginal portion of the colored surface being free of said sticky substance.

2. A sheet of fly paper containing strips of a comparatively rough surface extending over a minor part of the surface of the paper, the remaining major part of the surface of the paper being comparatively smooth and being of a color for which the fly exhibits a preference and more or less of the surface of which is covered with an adhesive material.

3. A sheet of fly paper comprising a marginal portion relatively free of sticky material, an interior portion covered with sticky material and strips having a comparatively rough surface enclosing the interior sticky area, both the interior sticky area and the marginal portion being of a distinctive color adapted to attract flies.

4. A sheet of fly paper comprising a marginal portion relatively free of sticky material, an interior portion covered with sticky material and strips having a comparatively rough surface enclosing the interior sticky area and relatively free of said sticky material, both the interior sticky area and the marginal portion being of a distinctive color different from that of the roughened strips.

5. A sheet of fly paper comprising a marginal portion relatively free of sticky material, an interior portion covered with sticky material and strips having a comparatively rough surface enclosing the interior sticky area, the said enclosing strips being connected by one or more strips intersecting the interior sticky area, both the interior sticky area and the marginal portion being of a distinctive color adapted to attract flies.

WILLIAM S. KELL.